R. W. PITTMAN.
DISSOLVING SHUTTER FOR MOTION PICTURE APPARATUS.
APPLICATION FILED MAR. 8, 1921.
1,404,404.
Patented Jan. 24, 1922
2 SHEETS—SHEET 1.
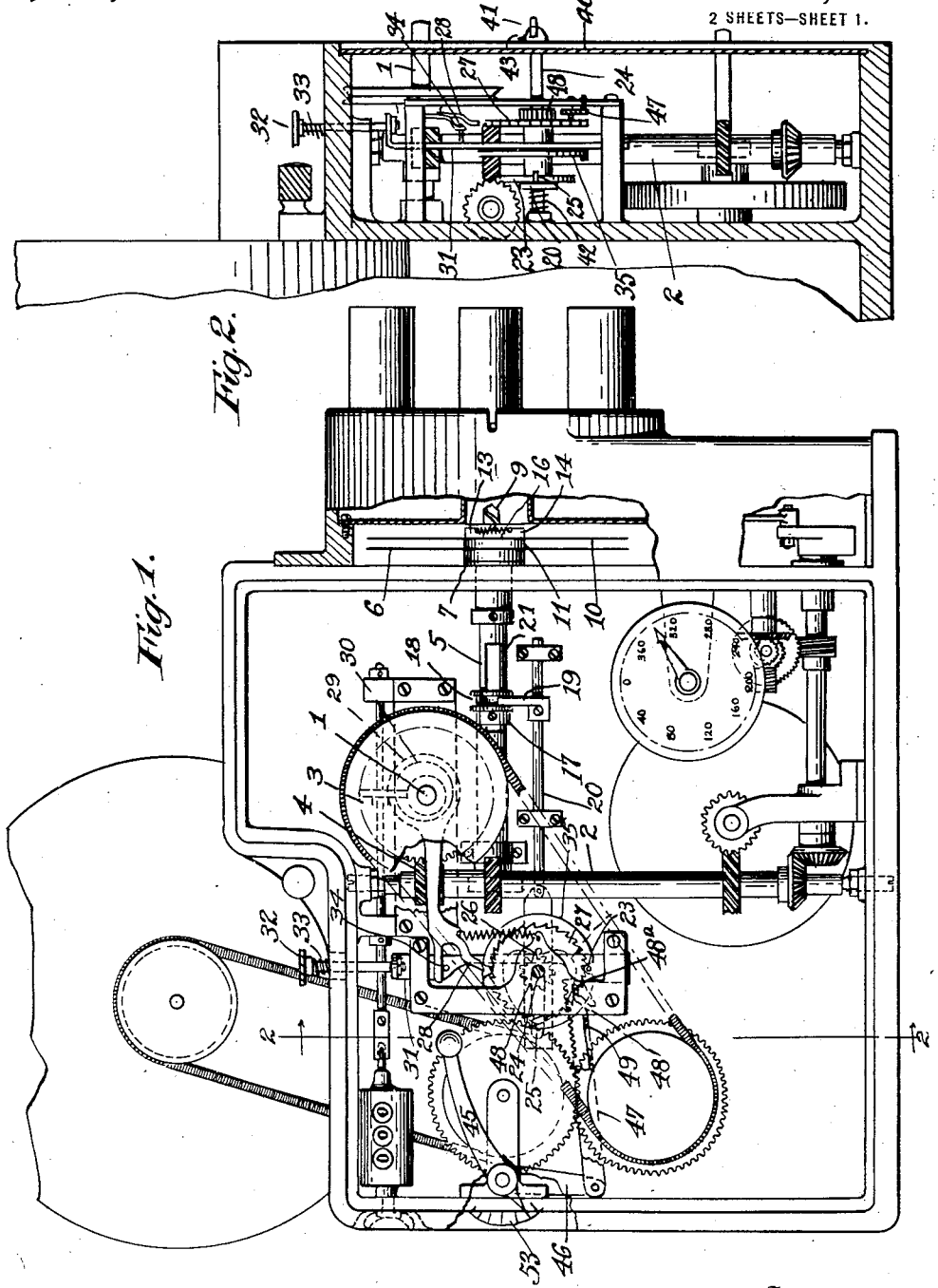
Inventor
R. W. Pittman
By his Attorney
Wm H. Reid

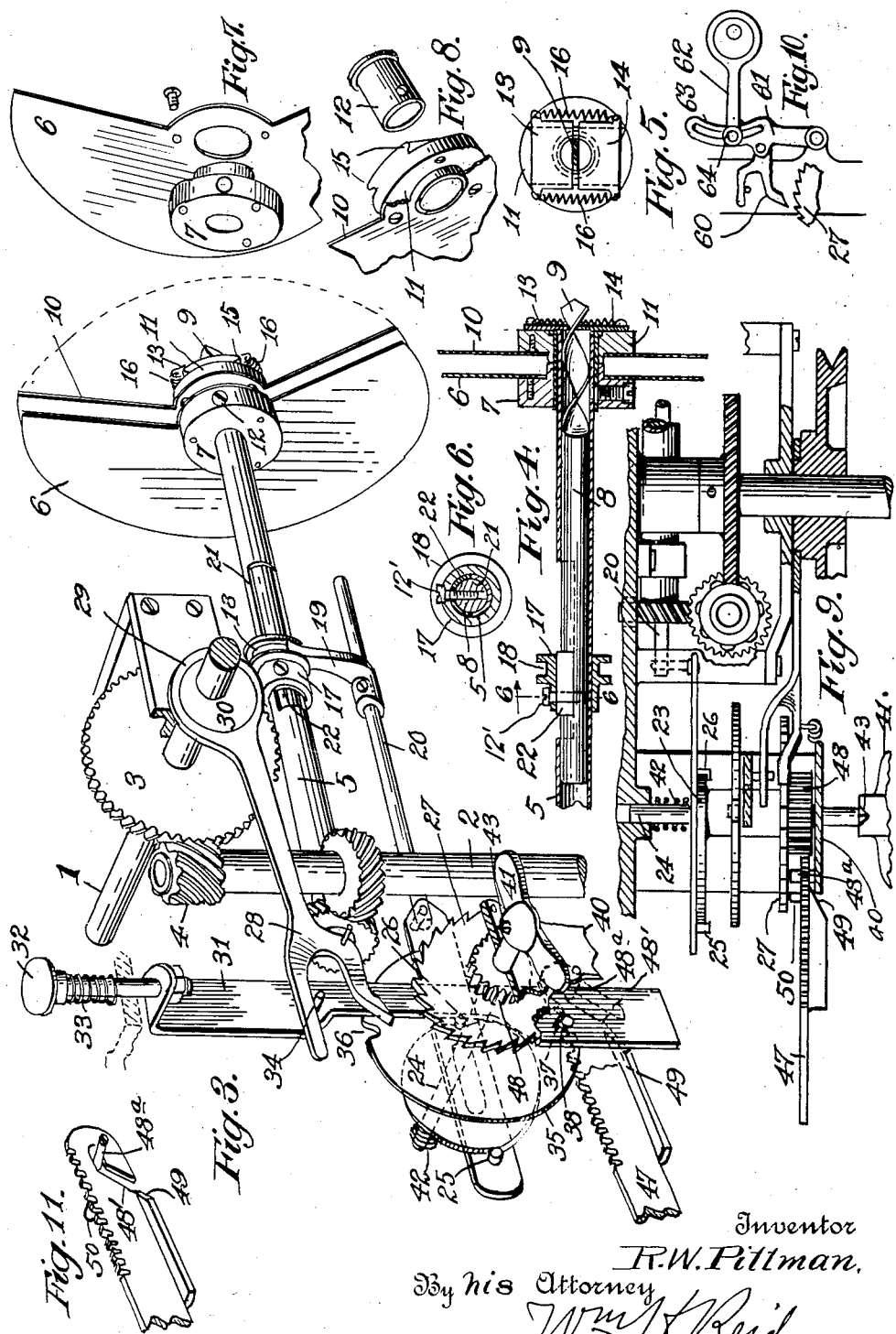

UNITED STATES PATENT OFFICE.

REINHART W. PITTMAN, OF NEW YORK, N. Y.

DISSOLVING SHUTTER FOR MOTION-PICTURE APPARATUS.

1,404,404.  Specification of Letters Patent.  Patented Jan. 24, 1922.

Application filed March 8, 1921. Serial No. 450,704.

*To all whom it may concern:*

Be it known that I, REINHART W. PITTMAN, a citizen of the United States of America, and resident of New York city, in the county of New York and State of New York, have invented certain new and useful Improvements in Dissolving Shutters for Motion-Picture Apparatus, of which the following is a full, clear, and exact description.

This invention relates more particularly to the shutter mechanism for a motion picture camera, of the type provided with a movable wing on the shutter that is shifted thereon to reduce the shutter opening during the operation of the shutter.

The object of this invention is to provide an improved construction of this character in which the wing is automatically shifted across the shutter opening during the operation of the shutter, and also moved to again expose the opening.

A further object of the invention is to provide an operating member in connection with such mechanism whereby the movement of the wing across the shutter opening is effected directly under the control of the operator, and the wing can be caused to remain in any desired position relative to the shutter during the rotation of the shutter and wing.

A further object of the invention is to provide in connection with a mechanism of this character, an additional operating member so that when the shutter is at rest the wing can be shifted from the open position to the closing position; and can also be shifted from the closing position back to the open position.

In the accompanying drawing showing embodiments of my invention, Fig. 1 is a view of a camera of this character in side elevation with the side plate removed.

Fig. 2 is a vertical section on the line 2—2 of Fig. 1.

Fig. 3 shows some of the parts in perspective.

Fig. 4 is a section of the shutter and wing operating means.

Fig. 5 shows the spring nut for the wing of the shutter.

Fig. 6 is a section on the line 6—6 of Fig. 4.

Figs. 7 and 8 show details of the shutter mounting.

Fig. 9 is top view of certain parts.

Fig. 10 shows a detail of modification.

Fig. 11 shows a part of the rack for the hand-controlled dissolve.

My invention is shown applied to a camera for taking motion pictures, in which a film is intermittently advanced across a focal axis, and in which a shutter is arranged to intermittently expose the film at each successive advance, and is of the rotary type. I show a main driving shaft 1, that by a suitable operating mechanism serves to actuate the film feed in any suitable manner and intermittently advance the film, that includes an upright shaft 2, rotated by spiral gears 3 and 4, see Fig. 3. A tubular shaft 5, is suitably supported and carries a main shutter 6, secured thereon by a collar 7, see Fig. 7. This shutter 6 has the usual open portion that will expose the film for the proper time in each revolution. The tubular shaft 5 carries a rod 8, slidable therein, see Fig. 4, and at one end this rod is provided with a spiral flattened portion 9. A second shutter or wing member 10 is arranged to turn on the tubular shaft 5, and at the same time to partake of the rotation of this shaft. A collar 11 is mounted loose on the shaft 5, and is held against the collar 7 by a sleeve 12, with a flange at one end, see Fig. 8, a screw 12' passing through this collar into the shaft 5. The flange of the sleeve holds the collar 11 rotatably on the shaft 5 and the wing 10 is secured to the collar 11, as shown. A spring nut is formed by plates 13, 14, connected by springs 16, that slide on a guide portion 15 of the collar 11, see Fig. 8, which plates are pressed against the flat spiral 9 by the springs, see Fig. 4. This will cause the wing 10 to be carried around by the bar 8, when the latter moves around with the sleeve shaft 5, and endwise movement of the bar in the sleeve shaft will turn the wing 10 relative to the shutter 6. This will cause the normal opening of the shutter 6 to be reduced to any desired amount, and also to be completely closed. A sleeve 17 is slidably mounted on the tubular shaft 5, and has an annular channel 18 thereon that is constantly engaged by an arm 19 carried by a controlling bar 20. The outer shaft 5 has a slotted portion 21, and a piece 22 is slidable in this slot endwise, and is secured to the sleeve 17 by screw 12'. By this means the rod 8 will move endwise in the tubular shaft 5, but cannot turn therein, and the arm 19 will constantly engage the sleeve 17 during rotation of the shaft 5, yet will advance the rod 8 inside of the shaft when desired, and the latter movement by the spiral portion 9 will shift the wing 10 relative to the shutter 6 during the rotation of the shaft and shutter. By this means the wing can be caused to assume any position desired to reduce the amount of the shutter opening, or close it completely.

I further provide mechanism actuated by the main shaft to cause reciprocation of the control bar 20 in a predetermined time relative to the rotation of the shaft 1 and of the shutter 6. This mechanism is controlled by a button on the outside of the camera that is simply advanced, and which will cause such mechanism to make one shifting the wing completely across the shutter opening, or to retract the wing to provide full normal exposure. As shown the rod 20, is retracted by a double cam 23 of heart shape mounted on a shaft 24, which cam engages pins 25 and 26 on the extension of the rod 20, see Fig. 1. One revolution of this cam will advance and then retract the bar 20, to effect a complete dissolve as stated. Shaft 24 carries a ratchet wheel 27 actuated by a pawl 28, whose end 29 forms a strap for an eccentric 30 fast on shaft 1. Each rotation of this shaft will move the pawl back and forth, that may advance the ratchet wheel 27 one or more teeth, which will operate the bar 20, and shift the wing on the shutter. Since the pawl is normally reciprocated through the shaft, I provide a control bar 31 having a button 32, outside of the camera, normally pressed upward by a coil spring 33. A pin 34 on bar 31 serves to hold the pawl 28 up, with the pawl out of engagement with the ratchet wheel, see Fig. 3. On depression of this bar by the button, the pawl will fall on the ratchet wheel, and its operation by shaft 1 will rotate the cam shaft 24.

I further provide means for holding the control bar 31 in the depressed position until the cam shaft has made one half of a revolution to cause the wing to move across the shutter, and then this bar will rise to withdraw the pawl from the ratchet wheel. A disc 35 is fast on the cam shaft 24, and has opposite notches 36 and 37 arranged to engage a pin 38 on the lower part of the bar 31, and the spring 33 will normally hold the slide 31, with the pin 38 in the one of the notches as 37, thus preventing rotation of the cam shaft 24. On depression of the button, the disc 35 will be released and the pawl will engage the ratchet wheel and turn the shaft and the disc 35. The rise of the bar 31 at this time will bring the pin 38 against the edge of the disc 31 beyond the notch 37 and this is so arranged that the pawl will not now be raised by the pin 34 free of the ratchet wheel, but will be pressed against this edge. As a half rotation is completed, the notch 36 will move around and receive the pin 38, when the slide 31 will be raised by its spring and the pawl lifted from the ratchet wheel. The cam 23 by a half revolution will make a complete advance of the rod 20 that will cause one half rotation of the wing 10 by the spiral portion 9, so that a dissolve will be effected. It will be understood that the next depression of the slide will cause another half revolution of the disc 35 and the cam, and the same movement will be produced, the rod 20 causing the bar 9 to move back the same distance, and complete rotation of the wing 10 relative to the shutter 6.

I further provide means for moving the slide 20 back and forth manually, so that the operator can shift the wing 10 to any desired position relative to the shutter 6, that will remain in such adjusted position. Also the slide 20 can be moved back and forth to cause a dissolve by manual operation at any desired speed, under complete control of the operator. The cam shaft 24 is projected through the side wall 40, and provided with a wing or head 41, to turn the cam 23 and so operate the wing 10 on the shutter. But to do this without depressing the button 32 and slide, I make the cam shaft 24 slidable, so that when moved inwardly it will shift the disc 35 away from the pin 38 on the slide 31. Since the pawl is held free from the ratchet wheel, this shaft is free to be turned by the operator by the head 41. It will be understood that the cam 23 remains engaging the pins 25 and 26 on the bar 20 during this movement. A coil spring 42 serves to press the cam shaft 24 outwardly to its normal position, and when pushed inward and turned, the disc 35 will press against the pin 38 to prevent such revolution until a half revolution is made, which latter will bring the notch 36 opposite the pin and permit the shaft to move outward. One advantage of this arrangement is that when the automatic dissolve has been operated by pressing down the button and the wing is shifted from the open around to the closed position by the main shaft, with this shaft stopped, the wing can be returned to its normal position by the half rotation of the disc 35 and cam 23. Obviously, the reverse can be effected if desired, and the wing shifted to the closed position and then gradually opened by the said automatic means. The wing head 41 on this cam shaft 24, also serves as an indicator because the automatic dissolve causes a half rotation of the cam shaft 24, and will turn this wing head a half revolution; and a pointer 43 thereon can register with marks on the side plate, in its upper and lower position. The operator is thus informed when the button is pressed and the dissolve operates, just when the dissolve is finished, either opened or closed.

I further provide a control means for effecting this movement of the slide 20 by a lever that moves over an indicating scale. A lever 45 on the side plate has an arm 46 inside, on which is pivoted a rack bar 47, that projects beneath a gear 48 fast on cam shaft 24. When this lever is swung to advance the rack bar, a cam slot 48' therein rides on a pin 48ª that moves the rack up to engage the gear 48. But a cam face 49 on the rack bar will first move the rack bar inwardly, and a stop pin 50 on the rack bar engages the side of the ratchet 27 fast on the cam shaft, to move this shaft inwardly and cause disc 35 to be free of the pin 38 on the slide 31. This is done just before the rack bar engages the gear 48, and this shaft being now free to turn, will be swung by the rack bar. The bar 20 will be thereby advanced and shift the wing 10 on the shutter. This lever can shift the wing the full distance or any part thereof, as indicated by the scale 53 adjacent the arm 45. By this means a hand dissolve can be made, independent of the automatic means. But the lever must be brought back to the normal position to disengage the rack, and permit return of the cam shaft to a normal position, before the automatic dissolve can be again operated.

In Fig. 10 a modification is shown in which the pawl 60 for the gear ratchet wheel 27 is carried on an arm 61. The eccentric arm 62 engages a slide portion 63 of the arm 61, adjustable thereon by a bolt 64. This adjustment varies the travel of the pawl 60 and for each swing of the pawl, a greater or less number of teeth are advanced on the ratchet wheel as desired, which will vary the speed of the dissolve relative to the speed of the shutter.

What I claim is:

1. In a camera, the combination with a rotatable shutter having an aperture to intermittently expose a lens, and a wing on said shutter movable thereon, of means for shifting the said wing on the shutter to expose and cover said aperture during rotation of the shutter, comprising a shaft on which said shutter is mounted, a bar slidable on said shaft to shift said wing, a driving shaft connected with the shutter shaft, a rotatable ratchet, a pawl rocked by the driving shaft and arranged to advance the ratchet, a control slide projecting out of the camera and arranged to cause said pawl to engage said ratchet, a cam fast to said ratchet and connected with said wing bar to reciprocate the bar during rotation of the shutter shaft, and means for holding the control slide with the pawl in engagement with said ratchet until said wing has moved across the shutter, and to thereupon release the pawl and slide.

2. In a camera, the combination with a rotatable shutter having an aperture to intermittently expose a lens, and a wing on said shutter movable thereon, of means for shifting the said wing on the shutter to expose and cover said aperture during rotation of the shutter, comprising a shaft on which said shutter is mounted, a bar slidable on said shaft to shift said wing, a driving shaft connected with the shutter shaft, a rotatable ratchet, a pawl rocked by the driving shaft and arranged to advance the ratchet, a control slide projecting out of the camera and arranged to cause said pawl to engage said ratchet, a cam fast to said ratchet and connected with said wing bar to reciprocate the bar during rotation of the shutter shaft, and means for holding the control slide with the pawl in engagement with said ratchet until said wing has moved across the shutter and to thereupon release the pawl and slide, a lever projecting beyond the casing, and means connecting the lever and said gear arranged to cause advance of the wing bar from advance of said lever.

3. In a camera, the combination with a rotatable shutter having an aperture to intermittently expose a lens, and a wing on said shutter movable thereon, of means for shifting the said wing on the shutter to expose and cover said aperture during rotation of the shutter, comprising a shaft on which said shutter is mounted, a bar slidable on said shaft to shift said wing, a driving shaft connected with the shutter shaft, a rotatable ratchet, a pawl rocked by the driving shaft and arranged to advance the ratchet, a control slide projecting out of the camera and arranged to cause said pawl to engage said ratchet, a cam fast to said ratchet and connected with said wing bar to reciprocate the bar during rotation of the shutter shaft, and means for holding the control slide with the pawl in engagement with said ratchet until said wing has moved across the shutter and to thereupon release the pawl and slide, a lever projecting beyond the casing, and means connecting the lever and said ratchet arranged to first disconnect the ratchet from the control slide and then to cause advance of the wing bar from continued advance of said lever.

4. In a camera, the combination with a rotatable shutter having an aperture to intermittently expose a lens, and a wing on said shutter movable thereon, of means for shifting the said wing on the shutter to expose and cover said aperture during rotation of the shutter, comprising a shaft on which said shutter is mounted, a bar slidable on said shaft to shift said wing, a driving shaft connected with the shutter shaft, a rotatable ratchet, a pawl rocked by the driving shaft and arranged to advance the ratchet, a control slide projecting out of the camera and arranged to cause said pawl to engage said ratchet, a cam fast to said ratchet and connected with said wing bar to reciprocate the bar during rotation of the shutter shaft, and means for holding the control slide with the pawl in engagement with said ratchet until said wing has moved across the shutter and to thereupon release the pawl and slide, said latter means being shiftable to cause the wing bar to be moved to open or to close the shutter aperture at will.

5. In a camera, the combination with a rotatable shutter having an aperture to intermittently expose a lens, and a wing on said shutter movable thereon, of means for shifting the said wing on the shutter to expose and cover said aperture during rotation of the shutter, comprising a shaft on which said shutter is mounted, a bar slidable on said shaft to shift said wing, a driving shaft connected with the shutter shaft, a rotatable ratchet, a pawl rocked by the driving shaft and arranged to advance the ratchet, a control slide projecting out of the camera and arranged to cause said pawl to engage said ratchet, a cam fast to said ratchet and connected with said wing bar to reciprocate the bar during rotation of the shutter shaft, and means for holding the control slide with the pawl in engagement with said ratchet until said wing has moved across the shutter, and to thereupon release the pawl and slide, said latter means being shiftable to cause the wing bar to be moved to open or to close the shutter aperture at will, a lever projecting beyond the casing, and means connecting the lever and said ratchet arranged to first disconnect the ratchet from the wing bar and then to cause advance of the wing bar from continued advance of said lever.

6. In a camera, the combination with a rotatable shutter having an aperture to intermittently expose a lens, and a wing on said shutter movable thereon, of means for shifting the said wing on the shutter, comprising a shaft on which said shutter is mounted, a bar slidable on said shaft to shift said wing, a driving shaft connected with the shutter shaft, a rotatable ratchet, a pawl rocked by the driving shaft and arranged to advance the ratchet, a control piece projecting out of the camera and arranged to cause said pawl to engage and advance said ratchet, a cam fast to said ratchet and connected with said wing bar to reciprocate the bar during rotation of the shutter shaft, a spring to retract the control slide, a disk fast to said ratchet having a pair of opposed notches, a pin on said slide that is held against said disk by said spring whereby when the said pin on the slide enters one of said notches the slide will be advanced to release the pawl from the ratchet, and when the pin engages the disk beyond said notches the pawl will be held in engagement with the ratchet to cause the wing to move across the shutter.

7. In a camera, the combination with a rotatable shutter having an aperture to intermittently expose a lens, and a wing on said shutter movable thereon, of means for shifting the wing on the shutter to open and close said aperture during rotation of the shutter, comprising a shaft on which said shutter is mounted, a bar slidable on said shaft to shift said wing, a driving shaft connected with the shutter shaft, a rotatable ratchet, a pawl rocked by the driving shaft and arranged to advance the ratchet, a control piece projecting out of the camera and arranged to cause said pawl to engage and advance said ratchet, a cam fast to said ratchet and connected with said wing bar to reciprocate the bar during rotation of the shutter shaft, a spring to retract the control slide, a disk fast to said ratchet having a pair of opposed notches, a pin on said slide that is held against said disk by said spring whereby when the said pin on the slide enters one of said notches the slide will be advanced to release the pawl from the ratchet, and when the pin engages the disk beyond said notches the pawl will be held in engagement with the ratchet to cause the wing to move across the shutter.

8. In a camera, the combination of a rotatable shaft, a shutter fast on said shaft and having an aperture to intermittently expose a lens, a wing movably carried by said shutter to be rotated therewith and to shift across the shutter aperture during its rotation, said shaft having an axial bore, a bar slidable in said bore axially but held to turn with the shaft, said bar having a flat spiral portion, said wing having a pair of slidable plates engaging the spiral bar portion, and springs pressing the plates against the bar whereby movement of the rod endwise of the shaft will shift the wing across the shutter aperture during the rotation of all said members.

9. In a camera, the combination with a rotatable shutter having a wing movable thereon to vary the opening from closed to fully open position, and means for shifting the wing on the shutter during rotation including a slidable bar connected with the wing, a driving shaft connected with the shutter, a ratchet wheel, a pawl arranged to be rocked by the driving shaft to advance the ratchet wheel, a control slide projecting out of the camera and arranged to cause said pawl to engage said wheel, means connecting said wheel with said bar to shift the bar during operation of the shutter, and means connected with said ratchet wheel for holding the slide when advanced with the pawl engaging said wheel until the wing has fully moved and to thereupon release the slide and pawl.

10. In a camera, the combination with a rotatable shutter having a wing movable thereon to vary the opening from closed to fully open position, and means for shifting the wing on the shutter during rotation including a slidable bar connected with the wing, a driving shaft connected with the shutter, a ratchet wheel, a pawl arranged to be rocked by the driving shaft to advance the ratchet wheel, a control slide projecting out of the camera and arranged to cause said pawl to engage said wheel, means connecting said wheel with said bar to shift the bar during operation of the shutter, means connected with said ratchet wheel for holding the slide when advanced with the pawl engaging said wheel until the wing has fully moved and to thereupon release the slide and pawl, said slide normally holding said ratchet wheel against movement with the wing in either the fully open or fully closed position, a lever on the casing, and means connecting the lever and said ratchet wheel arranged to first release the wheel from said control slide and to thereupon cause said connecting means to shift the wing on further advance of the lever.

11. In a camera, a combination with a rotatable shutter having a wing movable thereon to vary the opening from closed to fully opened position and means for shifting the wing on the shutter during rotation including a slidable bar connected with the wing, a driving shaft connected with the shutter, a ratchet wheel, a pawl arranged to be rocked by the driving shaft to advance the ratchet wheel, a control slide projecting out of the camera and arranged to cause said pawl to engage said wheel, means connecting said wheel with said bar to shift the bar during operation of the shutter, and means connected with said ratchet wheel for holding the slide when advanced with the pawl engaging said wheel until the wing has fully moved and to thereupon release the slide and pawl, said connecting means being so arranged that the same advance of the control slide will cause said mechanism to shift the wing to the closed position if open, and also to the open position if closed.

12. In a camera, a combination with a rotatable shutter having a wing movable thereon to vary the opening from closed to fully opened position and means for receiving the wing on the shutter during rotation including a slidable bar connected with the wing, a driving shaft connected with the shutter, a ratchet wheel, a pawl arranged to be rocked by the driving shaft to advance the ratchet wheel, a control slide projecting out of the camera and arranged to cause said pawl to engage said wheel, means connecting said wheel with said bar to shift the bar during operation of the shutter, and means connected with said ratchet wheel for holding the slide when advanced with the pawl engaging said wheel until the wing has fully moved and to thereupon release the slide and pawl, said connecting means being so arranged that the same advance of the control slide will cause said mechanism to shift the wing to the closed position if open, and also to the open position if closed, and a control connected with said ratchet wheel arranged to shift the wing to either of said positions, whereby the subsequent operation of the control will result in said operation of the wing.

13. In a camera, a combination with a rotatable shutter having a wing movable thereon to vary the opening from closed to fully opened position and means for receiving the wing on the shutter during rotation including a slidable bar connected with the wing, a driving shaft connected with the shutter, a ratchet wheel, a pawl arranged to be rocked by the driving shaft to advance the ratchet wheel, a control slide projecting out of the camera and arranged to cause said pawl to engage said wheel, means connecting said wheel with said bar to shift the bar during operation of the shutter, stop means connected with said ratchet wheel for holding the slide when advanced with the pawl engaging said wheel until the wing has fully moved and to thereupon release the slide and pawl, said connecting means being arranged whereby the same advance of the control slide will cause said mechanism to shift the wing to the closed position if open, and also to the open position if closed, and a control connected with said ratchet wheel arranged to shift the wing to either of said positions, whereby the subsequent operation of the control will result in said operation of the wing, said shaft extending out of the camera and arranged to be shifted endwise whereby the shaft can be turned by the user to place the wing in any desired position relative to the shutter, and during rotation of shutter and wing.

Signed at New York city, March 7th, 1921.

REINHART W. PITTMAN.